Sept. 20, 1932.  G. J. HAAN, JR  1,878,394

DOOR HANDLE

Filed June 22, 1931

INVENTOR
Gilbert J. Haan Jr.
BY
Chappell & Earl
ATTORNEYS

Patented Sept. 20, 1932

1,878,394

UNITED STATES PATENT OFFICE

GILBERT J. HAAN, JR., OF GRAND RAPIDS, MICHIGAN, ASSIGNOR TO KEELER BRASS COMPANY, OF GRAND RAPIDS, MICHIGAN

DOOR HANDLE

Application filed June 22, 1931. Serial No. 545,883.

The main object of this invention is to provide a handle for automobile doors and the like which is attractive and massive in appearance, and at the same time is light in weight, strong and durable, and economical to produce.

A further object is to provide a structure in which the design may be very easily changed or modified.

Objects pertaining to details and economies of my invention will definitely appear from the description to follow. The invention is defined in the claims.

A structure which embodies the features of my invention is clearly illustrated in the accompanying drawing, in which.

Figure 1:
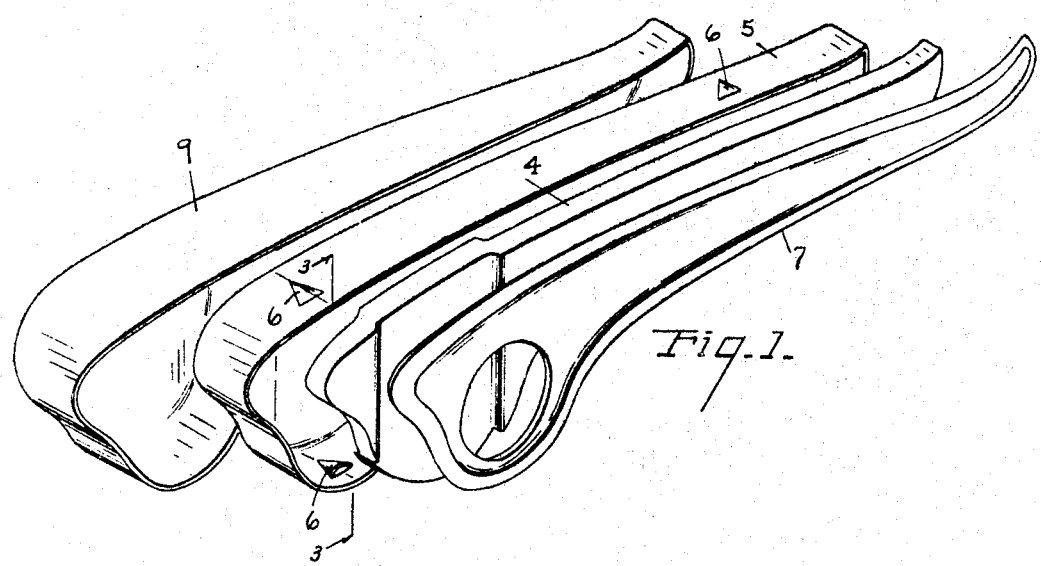
Fig. 1 is a perspective view of the handle parts in disassembled relation.
Figure 2:
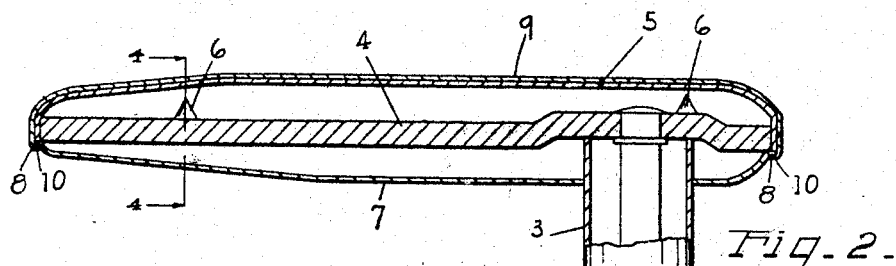
Fig. 2 is a fragmentary view of my improved handle mainly in longitudinal section.
Figure 3:
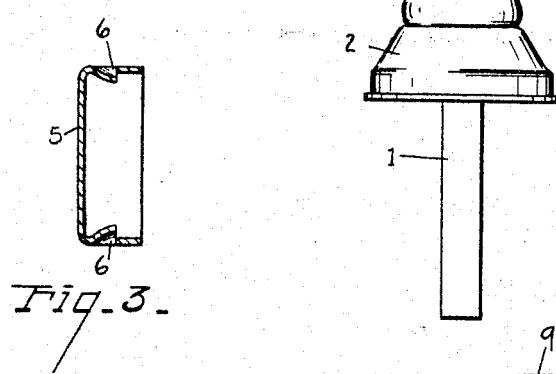
Fig. 3 is a transverse section through the inner casing member on a line corresponding to line 3—3 of Fig. 1.
Figure 5:
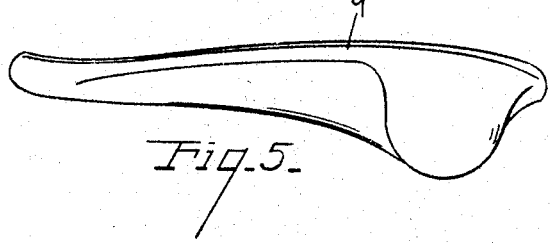
Fig. 5 is a front elevation.
Figure 4:
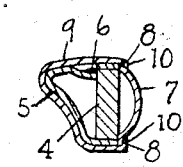
Fig. 4 is a transverse section on line 4—4 of Fig. 2.
Figure 4:
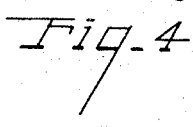

In the embodiment of my invention illustrated 1 represents the spindle of the latch, 2 an escutcheon and 3 a housing sleeve for the spindle. At the outer end of the spindle I fixedly secure a handle bar 4 of sufficient size and proper dimensions to sustain the stresses and support the casing parts. Over this handle bar I arrange an inner casing member 5 suitably conformed and of general channel cross section. This inner casing member is disposed so as to completely embrace the handle bar, that is, it fits over the edges thereof.

Lugs 6 are punched in from the sides of this inner casing member to engage the outer side of the handle bar, thereby limiting the inward movement of the casing member thereon.

The back plate or rear casing member 7 is arranged against the rear side of the handle bar and has outwardly projecting flanges 8 at its edges abutting the rear side of the handle bar and the edges of the inner casing member. The finishing member or outer casing member 9 is conformed to closely fit the inner casing member 5 and is sleeved thereon with its edges 10 flanged over the flanges 8 of the rear plate 7 so that the casing members are all secured in place without the aid of screws or similar fastenings.

The shape of the handles may be easily varied, that is, they may be made economically in varying shapes and finishes. The structure is light in weight and at the same time strong and durable.

Having thus described my invention what I claim as new and desire to secure by Letters Patent is:

1. In a structure of the class described, the combination with a spindle, of a handle bar fixedly secured to said spindle, a spindle housing sleeve disposed with its outer end in abutting engagement with the inner side of said bar, a conformed inner casing member embracing the edges of said handle bar and having stop lugs struck inwardly therefrom engaging the front of the bar, a conformed back plate having outwardly flanged edges disposed on the rear side of said bar in abutting engagement therewith, said back plate having an opening therein to receive said spindle sleeve, and an outer casing member embracing said inner casing member and having inturned flanges at its edges embracing the flanges of said back plate.

2. In a structure of the class described, the combination with a spindle, of a handle bar fixedly secured to said spindle, a conformed inner casing member embracing the edges of said handle bar and having stop lugs struck inwardly therefrom engaging the front of the bar, a conformed back plate having outwardly flanged edges disposed on the rear side of said bar in abutting engagement therewith, and an outer casing member embracing said inner casing member and having inturned flanges at its edges embracing the flanges of said back plate.

In witness whereof I have hereunto set my hand.

GILBERT J. HAAN, JR.